(12) United States Patent  (10) Patent No.: US 7,819,412 B2
McPherson  (45) Date of Patent: Oct. 26, 2010

(54) UNIVERSAL FENDER STEP

(75) Inventor: Gary M. McPherson, Wrightstown, PA (US)

(73) Assignee: Load Rite Trailers, Inc., Fairless Hills, PA (US)

( * ) Notice: Subject to any disclaimer, the term of this patent is extended or adjusted under 35 U.S.C. 154(b) by 493 days.

(21) Appl. No.: 11/941,155

(22) Filed: Nov. 16, 2007

(65) Prior Publication Data

US 2009/0127814 A1 May 21, 2009

(51) Int. Cl.
*B60R 3/00* (2006.01)
(52) U.S. Cl. ..................................................... 280/163
(58) Field of Classification Search ................ 280/163, 280/164.1, 164.2, 165, 166, 169; 296/62, 296/151
See application file for complete search history.

(56) References Cited

U.S. PATENT DOCUMENTS

| 428,081 | A | * | 5/1890 | Evans | 105/443 |
| 1,767,782 | A | * | 6/1930 | Awbrey | 52/179 |
| 1,768,873 | A | * | 7/1930 | Whitlock | 280/169 |
| 1,825,012 | A | * | 9/1931 | Ornberg | 280/163 |
| 1,833,584 | A | * | 11/1931 | Menton | 280/163 |
| 1,861,430 | A | * | 5/1932 | Bronson | 280/163 |
| 1,883,994 | A | * | 10/1932 | Lee | 52/181 |
| 1,901,869 | A | * | 3/1933 | Duffy | 280/163 |
| 1,905,895 | A | * | 4/1933 | Bronson | 280/163 |
| 1,928,682 | A | * | 10/1933 | Bronson | 280/163 |
| 2,009,204 | A | * | 7/1935 | Pryale | 280/163 |
| 2,020,135 | A | * | 11/1935 | Cavanagh | 280/163 |
| 2,020,993 | A | * | 11/1935 | Chamberlin | 52/716.5 |
| 2,057,873 | A | * | 10/1936 | Atwood | 428/40.1 |
| 2,070,839 | A | * | 2/1937 | Place | 52/177 |
| 2,077,822 | A | * | 4/1937 | Baker | 343/712 |
| 2,255,880 | A | * | 9/1941 | Gregorie | 296/151 |
| 2,312,812 | A | * | 3/1943 | Geyer | 296/151 |
| 2,327,329 | A | * | 8/1943 | Murphy | 52/718.03 |
| 2,358,206 | A | * | 9/1944 | Boersma | 52/716.5 |
| 2,361,610 | A | * | 10/1944 | Doty et al. | 280/163 |
| 3,684,311 | A | * | 8/1972 | Pierce | 280/847 |
| 3,774,952 | A | * | 11/1973 | Zorn | 293/117 |
| D233,663 | S | * | 11/1974 | Facer et al. | D25/126 |
| 4,056,270 | A | * | 11/1977 | Greenfield | 280/166 |
| 4,095,818 | A |   | 6/1978 | Smith | |
| 4,203,611 | A | * | 5/1980 | Makela | 280/163 |
| 4,257,620 | A | * | 3/1981 | Okland | 280/848 |

(Continued)

*Primary Examiner*—S. Joseph Morano
*Assistant Examiner*—Jacob Meyer
(74) *Attorney, Agent, or Firm*—Paul & Paul

(57) ABSTRACT

A universal fender step for a boat trailer and the like includes a channel of trapezoidal-shaped cross-section. Longitudinally extending gutters at each of the four corners of the trapezoid shape extend the length of the channel. A slip resistant surface is provided on the top face. The channel is formed as a long beam and then cut to a length needed for a particular step. An end plate is attached to an open end of the channel with four push-pins, screws or other type fasteners which each engage a respective end of one of the gutters. A pair of mounting holes is each positioned in each side wall juxtaposed from each other. These mounting holes accommodate bolts for attaching a side wall to a trailer fender. An elongate hole in the channel's top face permits the positioning of a further mounting bolt with a trailer side rail. A lamp may be mounted to one side wall with the wiring harness extending in a longitudinal gutter and held therein by clips.

4 Claims, 3 Drawing Sheets

U.S. PATENT DOCUMENTS

| | | | | |
|---|---|---|---|---|
| D261,133 S * | 10/1981 | Makela | | D12/203 |
| 4,311,320 A * | 1/1982 | Waters, Jr. | | 280/163 |
| 4,355,842 A * | 10/1982 | Hira | | 296/199 |
| 4,451,063 A * | 5/1984 | Snyder | | 280/163 |
| 4,456,275 A * | 6/1984 | Snyder et al. | | 280/163 |
| 4,463,962 A * | 8/1984 | Snyder | | 280/164.1 |
| 4,464,092 A | 8/1984 | Chambers et al. | | |
| 4,544,991 A * | 10/1985 | Gorsuch | | 362/495 |
| 4,557,494 A * | 12/1985 | Elwell | | 362/495 |
| 4,717,165 A * | 1/1988 | Johnson | | 280/414.1 |
| 4,820,111 A | 4/1989 | Godbersen | | |
| 4,836,569 A | 6/1989 | Godbersen | | |
| 4,934,721 A * | 6/1990 | Flores | | 280/169 |
| 4,935,638 A * | 6/1990 | Straka | | 280/164.1 |
| 4,943,076 A * | 7/1990 | Tripke | | 280/166 |
| 4,986,571 A | 1/1991 | Godbersen | | |
| 5,171,037 A | 12/1992 | Thompson et al. | | |
| 5,193,829 A * | 3/1993 | Holloway et al. | | 280/163 |
| 5,265,896 A * | 11/1993 | Kravitz | | 280/163 |
| 5,286,049 A * | 2/1994 | Khan | | 280/163 |
| D349,678 S * | 8/1994 | Waddington et al. | | D12/203 |
| D351,128 S * | 10/1994 | Waddington et al. | | D12/203 |
| 5,382,035 A * | 1/1995 | Waddington et al. | | 280/169 |
| 5,429,412 A | 7/1995 | Schoen et al. | | |
| 5,511,750 A * | 4/1996 | Evenson | | 248/200 |
| D371,336 S * | 7/1996 | Wilson | | D12/203 |
| 5,713,589 A * | 2/1998 | Delgado et al. | | 280/163 |
| 5,738,362 A | 4/1998 | Ludwick | | |
| 5,769,439 A * | 6/1998 | Thompson | | 280/163 |
| 5,799,961 A | 9/1998 | Schmeets | | |
| 5,816,616 A * | 10/1998 | Boyd | | 280/847 |
| 5,823,553 A * | 10/1998 | Thompson | | 280/164.1 |
| 5,895,064 A * | 4/1999 | Laubach | | 280/163 |
| 5,947,506 A | 9/1999 | Bauer | | |
| 6,050,579 A * | 4/2000 | Selland et al. | | 280/163 |
| 6,102,468 A | 8/2000 | Lowrey et al. | | |
| 6,135,526 A | 10/2000 | Reckner, Jr. | | |
| 6,145,861 A * | 11/2000 | Willis | | 280/163 |
| 6,145,865 A | 11/2000 | Gannara et al. | | |
| D434,711 S * | 12/2000 | McQuiston | | D12/203 |
| 6,170,843 B1 | 1/2001 | Maxwell et al. | | |
| 6,173,979 B1 * | 1/2001 | Bernard | | 280/163 |
| 6,199,890 B1 | 3/2001 | Lindenman et al. | | |
| 6,203,040 B1 * | 3/2001 | Hutchins | | 280/169 |
| 6,237,927 B1 | 5/2001 | Debo | | |
| 6,283,537 B1 | 9/2001 | DeVore, III | | |
| 6,409,193 B2 * | 6/2002 | Bernard | | 280/163 |
| 6,412,799 B1 | 7/2002 | Schrempf | | 280/163 |
| 6,425,627 B1 | 7/2002 | Gee | | |
| 6,439,589 B1 * | 8/2002 | Payne | | 280/163 |
| 6,474,668 B2 | 11/2002 | Debo | | |
| 6,474,851 B1 * | 11/2002 | Baley | | 362/477 |
| 6,478,103 B1 | 11/2002 | Matsuura | | |
| 6,507,973 B1 * | 1/2003 | Friesen | | 15/250.06 |
| 6,511,086 B2 | 1/2003 | Schlicht | | |
| 6,513,821 B1 * | 2/2003 | Heil | | 280/169 |
| 6,533,302 B2 * | 3/2003 | Scruggs et al. | | 280/163 |
| 6,581,946 B2 * | 6/2003 | Lund et al. | | 280/163 |
| 6,588,782 B2 * | 7/2003 | Coomber et al. | | 280/163 |
| 6,592,135 B2 * | 7/2003 | Hendrix | | 280/164.1 |
| 6,592,147 B2 | 7/2003 | Lambertus | | |
| 6,659,484 B2 | 12/2003 | Knodle et al. | | |
| 6,702,329 B1 | 3/2004 | Nishio | | |
| 6,733,219 B1 | 5/2004 | Floe | | |
| 6,769,704 B2 | 8/2004 | Cipolla | | |
| 6,869,092 B1 | 3/2005 | Henn | | |
| 6,935,647 B2 | 8/2005 | Knodle et al. | | |
| 6,986,523 B1 * | 1/2006 | Bickford | | 280/414.1 |
| D514,492 S * | 2/2006 | Metros et al. | | D12/203 |
| 6,997,469 B2 * | 2/2006 | Lanoue et al. | | 280/163 |
| 7,000,932 B2 * | 2/2006 | Heil et al. | | 280/163 |
| D520,429 S * | 5/2006 | Woodard | | D12/203 |
| 7,070,195 B2 * | 7/2006 | Roberts, Jr. | | 280/414.1 |
| 7,083,179 B2 * | 8/2006 | Chapman et al. | | 280/163 |
| 7,086,656 B2 * | 8/2006 | Kolpasky et al. | | 280/164.1 |
| 7,114,736 B2 | 10/2006 | Stodola et al. | | |
| 7,125,032 B2 | 10/2006 | Hopper | | |
| 7,131,655 B2 * | 11/2006 | Schumacher | | 280/163 |
| D535,928 S * | 1/2007 | Crandall | | D12/203 |
| 7,168,721 B2 * | 1/2007 | Mulder | | 280/163 |
| D537,399 S * | 2/2007 | Riddle | | D12/203 |
| 7,185,904 B1 | 3/2007 | Jones et al. | | |
| 7,204,501 B2 | 4/2007 | Bang et al. | | |
| D546,259 S * | 7/2007 | Metros et al. | | D12/203 |
| 7,287,770 B2 * | 10/2007 | Drabant et al. | | 280/163 |
| 7,311,320 B2 * | 12/2007 | Kuntze et al. | | 280/163 |
| 7,334,807 B2 * | 2/2008 | Mulder et al. | | 280/163 |
| 7,360,779 B2 * | 4/2008 | Crandall | | 280/163 |
| 7,380,806 B2 * | 6/2008 | Mulder | | 280/163 |
| 7,390,003 B1 * | 6/2008 | Sylvia | | 280/166 |
| 7,513,518 B1 * | 4/2009 | Mayville et al. | | 280/163 |
| D595,630 S * | 7/2009 | McPherson et al. | | D12/203 |
| 7,677,583 B2 * | 3/2010 | Armstrong et al. | | 280/163 |
| 7,690,161 B2 * | 4/2010 | McPherson | | 52/208 |
| 2001/0017452 A1 * | 8/2001 | Bernard | | 280/163 |
| 2002/0158439 A1 | 10/2002 | Benirschke | | 280/163 |
| 2002/0180174 A1 * | 12/2002 | Johnston | | 280/164.1 |
| 2002/0195792 A1 * | 12/2002 | Hendrix | | 280/164.1 |
| 2003/0006576 A1 * | 1/2003 | Lanoue et al. | | 280/163 |
| 2003/0011163 A1 * | 1/2003 | Coomber et al. | | 280/163 |
| 2003/0034626 A1 * | 2/2003 | Scruggs et al. | | 280/163 |
| 2003/0160417 A1 * | 8/2003 | Kayne | | 280/163 |
| 2003/0160418 A1 * | 8/2003 | Farkash | | 280/164.1 |
| 2003/0184039 A1 * | 10/2003 | Schumacher | | 280/163 |
| 2003/0222423 A1 * | 12/2003 | Weir | | 280/163 |
| 2004/0134131 A1 * | 7/2004 | Galer | | 49/413 |
| 2004/0145146 A1 * | 7/2004 | Wang | | 280/163 |
| 2004/0150183 A1 * | 8/2004 | Clermont et al. | | 280/163 |
| 2004/0173987 A1 * | 9/2004 | Chapman et al. | | 280/163 |
| 2004/0239068 A1 * | 12/2004 | Chuba et al. | | 280/163 |
| 2004/0256832 A1 * | 12/2004 | Bradsen et al. | | 280/163 |
| 2004/0256833 A1 | 12/2004 | Cervenka | | |
| 2005/0012294 A1 * | 1/2005 | Yang | | 280/163 |
| 2005/0012295 A1 * | 1/2005 | Chevalier et al. | | 280/163 |
| 2005/0046231 A1 | 3/2005 | Fusco | | |
| 2005/0062252 A1 * | 3/2005 | Vincent | | 280/163 |
| 2005/0179226 A1 * | 8/2005 | Kolpasky et al. | | 280/163 |
| 2005/0212249 A1 | 9/2005 | Lopez | | |
| 2005/0263974 A1 * | 12/2005 | Mulder | | 280/163 |
| 2005/0263975 A1 * | 12/2005 | Mulder et al. | | 280/163 |
| 2005/0275186 A1 * | 12/2005 | Drabant et al. | | 280/163 |
| 2006/0001229 A1 * | 1/2006 | Kayne | | 280/163 |
| 2006/0002120 A1 * | 1/2006 | Grigg et al. | | 362/475 |
| 2006/0097480 A1 | 5/2006 | Hegefeld | | |
| 2006/0119065 A1 * | 6/2006 | Lanoue et al. | | 280/163 |
| 2006/0163835 A1 * | 7/2006 | Mulder | | 280/163 |
| 2006/0170179 A1 | 8/2006 | Dahl | | |
| 2006/0249924 A1 * | 11/2006 | Armstrong et al. | | 280/163 |
| 2007/0126201 A1 * | 6/2007 | Crandall | | 280/163 |
| 2007/0138757 A1 * | 6/2007 | Kuntze et al. | | 280/163 |
| 2007/0204550 A1 * | 9/2007 | McPherson | | 52/633 |
| 2007/0267841 A1 * | 11/2007 | Mulder | | 280/163 |
| 2007/0290475 A1 * | 12/2007 | Reitinger | | 280/164.1 |
| 2007/0296175 A1 * | 12/2007 | Flajnik et al. | | 280/169 |
| 2008/0018074 A1 * | 1/2008 | Steffens et al. | | 280/163 |
| 2008/0246263 A1 * | 10/2008 | McPherson | | 280/798 |

* cited by examiner

UNIVERSAL FENDER STEP

RELATED APPLICATIONS

The present application is related to U.S. design application 29/297,710, for a Fender Step for Trailer, filed concurrently with this application.

BACKGROUND OF THE INVENTION

The present invention is directed to a step used for climbing onto a trailer. Trailer manufacturers, including boat trailer manufacturers, have found it advantageous to include one or more steps attached to members of a trailer for use in climbing onto the trailer to perform work, such as to tie-down a load or a boat, or to perform mechanical functions. Boat trailer manufacturers have found that steps mounted on or near wheel fenders are acceptable and popular with customers. Steps rearward of the wheel fenders are now regularly included on many boat trailers.

Trailer steps have taken many different styles and shapes, including elongate U-shaped "nurf bars" mounted outside a boat trailer frame side rail by bolting the bar brackets into a vertical wall of the side rail. Steps have also been made by welding, or bolting or clamping a plate, a box channel, or a C-channel to the side rail. Other steps have been made by extending an under-slung cross member, which is clamped between side rails, beyond each side rail. Even other steps are provided by molding a lateral step extension as a part of a fender with a portion of the step clamped to the side rail for stability.

Many of these trailer steps, such as the "nurf" bars, add considerable cost to the trailer. As fenders are generally made of plastic or fiberglass composite, steps that are made as extensions of the fenders are also the same material and tend to be not as strong as metal rails or channels and thus are less stable requiring additional clamping and reinforcement at stress points.

Molded plastic or fiberglass steps can be less expensive than their metal plate, beam, or channel counterparts, and are often extremely slippery when wet, as are metal steps. Typically, an owner or other workman needs to climb onto a boat trailer immediately after hulling a boat from the water. That is the exact time the steps are wet and slippery.

The objectives of the present invention are to provide what is desired.

What is desired is a structure for a boat trailer step, which is strong, durable and easy to mount to a boat trailer adjacent to a trailer fender, for both left-side and right-side installation, and installation at the front face and rear face of a fender.

What is secondly desired is such a step which has slip retardant features.

What is additionally desired is such a step which can be made from an extruded metal beam that can be cut to length for a desired trailer frame size.

What is also desired is such a step fitted with an end plate that will dress the end and cover rough sawed surfaces.

What is further desired is such a step that is capable of having the end plate readily installed without separate mounting structure on the step.

SUMMARY OF THE INVENTION

The objectives of the present invention are realized in a universal fender step made from an extruded C-channel having slanted side walls (i.e., flanges) forming a trapezoidal cross-sectional shape with the top surface (i.e., the web) of the channel and an open bottom face. The channel is cut to length from a long extrusion to fit a particular sized trailer.

The cross-sectional shape of the channel is symmetrical, with the slant of the side walls "set" to mate with the slant of the fenders to which a wall of the channel is bolted.

Small curved walls formed as a part of the extrusion form gutters positioned at each of the four corners of the trapezoid and extending longitudinally along the length of the channel. A slip resistant surface is provided on the outer top face of the channel. This slip resistant surface can include a series of parallel extending, upward standing ribs extending the length of the channel.

The C-channel, being formed in a long extrusion is sawed to the length. An end plate is attached to the sawed end of the channel with four push-pins which engage the ends of the four gutters. The end plate dresses the outer end of the channel forming the step, and covers the outer edge of the sawed end. The curved wall gutters each have a slot extending their length. The fact that the curved ends do not close, i.e., the gutters are not closed, provides for better metal flow during extrusion. The slot also provides an opening for inserting wiring and for receiving a clip.

A pair of mounting holes are drilled in each side flange of the channel for carrying a pair of bolts used for bolting the step to a fender. The paired bolt holes are in juxtaposed position along the C-channel. The fender mounting bolts are needed to extend only through the side (flange) of the channel adjacent the fender wall. Therefore the channel design accommodates both left-side (left-hand) and right-side (right-hand) trailer frame mounting, as well as mounting to the front of a fender or to the back of a fender, without modification to the manufactured product.

An elongate hole in the channel's top face acts as an adaptive structure which permits the positioning of a further mounting bolt for bolting the web (top wall) of the channel to a trailer side rail, generally bolting from the bottom of the side rail. The elongation of the hole accommodates for various side rail widths.

A clearance lamp or a marker lamp may be mounted to the outside flange of a channel, i.e., the flange opposite the fender mounting. A separate smaller mounting hole accommodates the lamp mounting bolt. The outer, unused fender bolt mounting hole on the lamp mounting flange is fitted with a grommet to provide protection for the lamp wiring. Lamp wiring extends, generally, the length to an adjacent gutter. Clips are employed to hold the wiring in position in the gutter.

BRIEF DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

The present invention is a universal step for a trailer, such as a boat trailer, which is suitable for mounting between the frame's side rail and the front or rear of a fender, either on the left-side or the right-side of the trailer.

Figure 1:
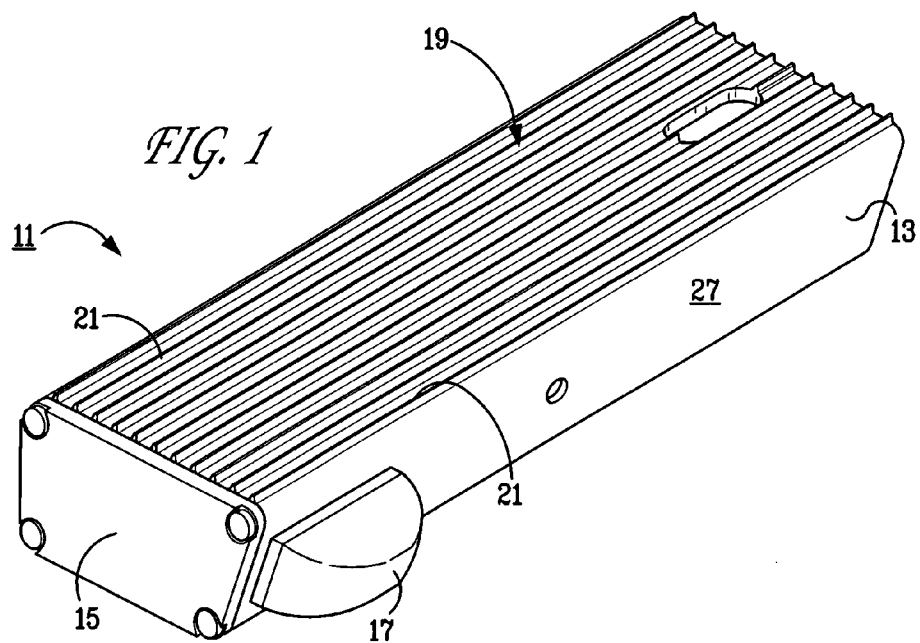
FIG. 1 is a perspective assembly drawing of the trailer step with the turn signal/marker lamp and end plate installed.

The step assembly 11, FIG. 1, includes an extruded C-channel member 13, an end plate 15 cover, and possibly a marker light or a clearance light 17. The channel member 13 extrusion has a wall thickness of approximately 3/8 inches thick, and has a slip retardant upper surface 19, which can be formed as a part of the extrusion. For example, the slip retardant surface 19 can include a plurality of parallel extending, upward standing ribs 21. The ribs 21 extend the entire length of the channel member 13 and are spaced apart approximately in the range of 1/4 to 5/16 inches. These ribs can have a generally triangular cross-section, FIGS. 2 and 8, and are approximately in the range of 1/16 to 3/32 inches high.

It is to be understood that the dimensions provided herein above and herein below are by way of example and can be changed to suit larger or smaller trailers, meet differing requirements for strength, and be changed as the metallurgy of the materials is changed without departing from the invention.

Figure 3:
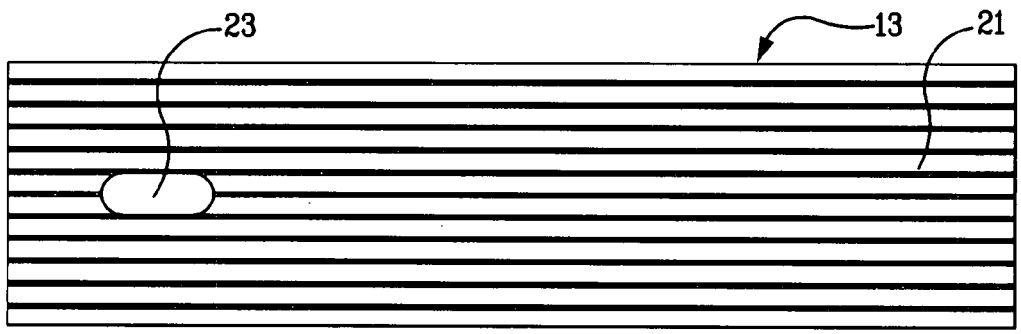
FIG. 3 is a top plan view of the extruded channel member.
Figure 4:
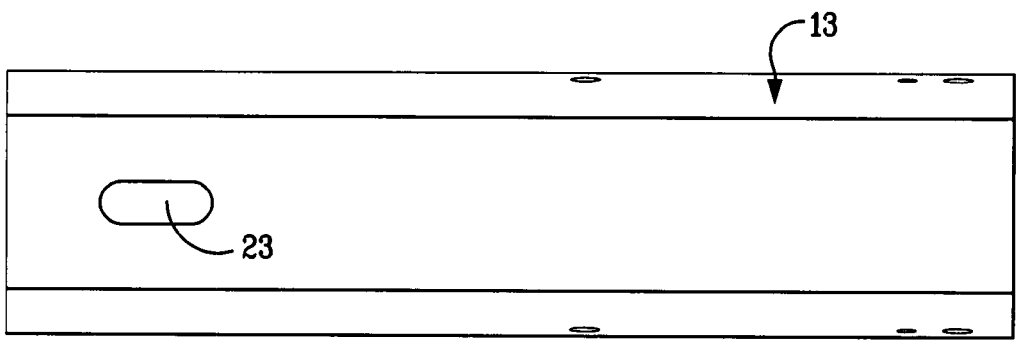
FIG. 4 is a bottom plan view of the extruded channel member of FIG. 3.

The channel member 13 is extruded from any of a number of alloys, with the preferred alloys being 5xxx, 6xxx, or 7xxx series aluminum. An elongate hole 23 acts as an adaptive structure for attaching the channel member 13 to the side rail of a trailer. The elongate hole 23 is cut or punched through the slip retardant top face 19 of the channel 13 adjacent the inboard end of the step 11, FIGS. 1, 3, 4. This elongate hole 23 has half-circle, rounded ends and has a width sized to receive a 3/8 to 1/2 inch threaded bolt (not shown). The length of the slot 23 is in the range of about 1 3/8 to 1 5/8 inches, which is sufficient for adjusting to a side rail attachment point between the two most popular sized side rails, those being a 3 inch wide side rail and a 4 inch wide side rail, and for other variations in side rail bolting position.

Figure 2:
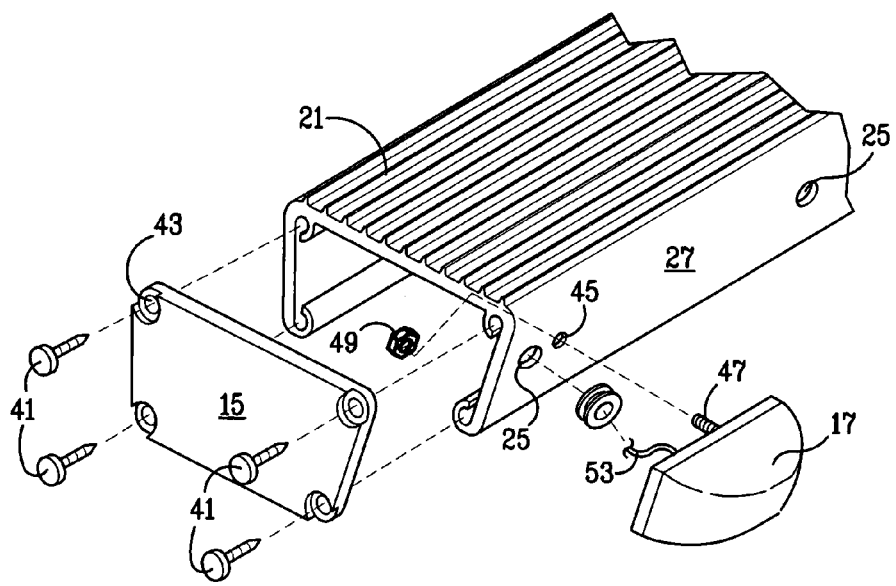
FIG. 2 is a cut-away, exploded view of the fender step of FIG. 1.
Figure 5:
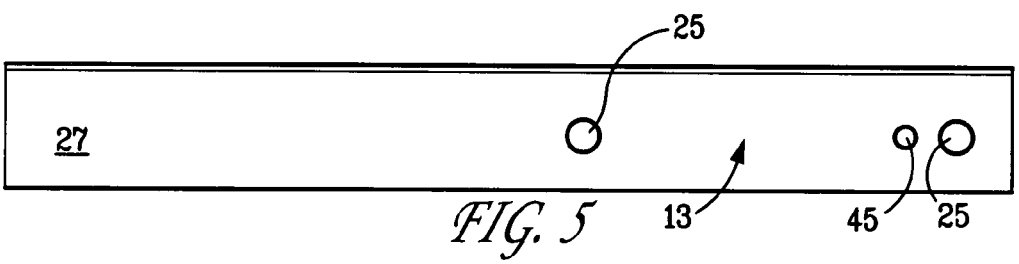
FIG. 5 is a left side elevation view of the extruded channel member of FIG. 3.
Figure 6:
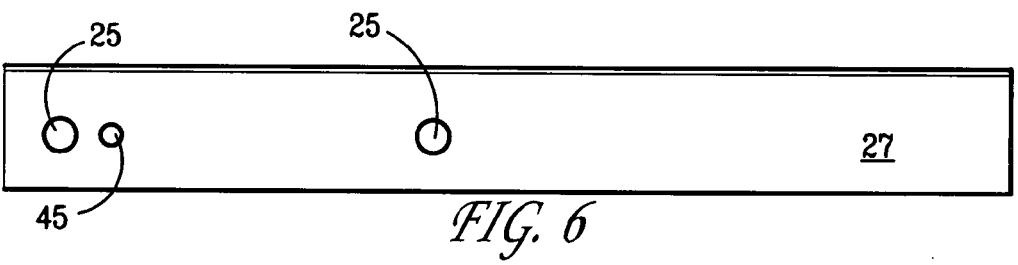
FIG. 6 is a right side elevation view of the extruded channel member of FIG. 3.
Figure 8:
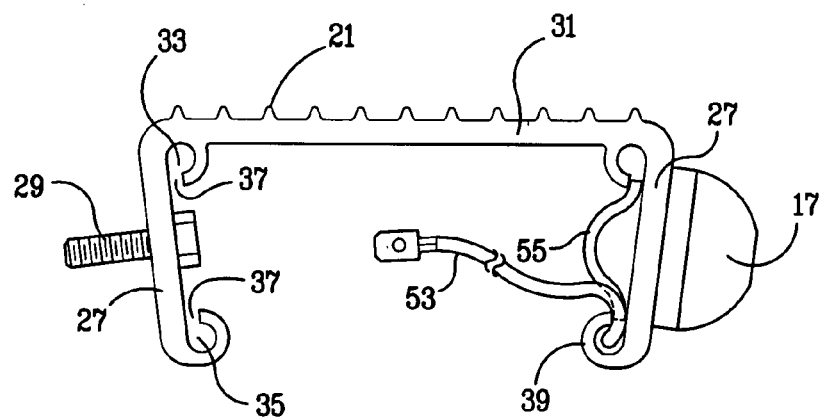
FIG. 8 is an end view of the assembly of FIG. 1 with the end plate removed.

A pair of fender bolt holes 25, FIGS. 2, 5 and 6, act as adaptive structure for attaching the channel member 13 to a trailer fender. A pair of the fender bolt holes 25 are drilled or punched into each side wall (channel member flange). These fender bolt holes 25 are sized for the anticipated weight calculated for the step to hold. Typically, fender mounting bolts 29, FIG. 8, are threaded 3/8 inch alloy steel, stainless steel or alloy aluminum bolts. The holes 25 for the fender bolts 29 can be positioned on about 5 inch centers, which will be suitable for most fenders provided on boat trailers.

The channel member 13 is cut or sawed to length depending upon the particular installation. Typically, a channel member 13 can be in the range of about 12 to 14 inches long and have a top face width in the range of about 3 1/4 to 3 3/4 inches. The side walls 27 (channel member flange) can be in the range of about 1 3/8 to 1 5/8 inches wide.

Figure 7:
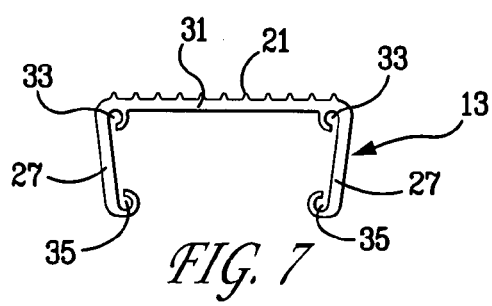
FIG. 7 is an end view of the extruded channel member of FIG. 3.
Figure 9:
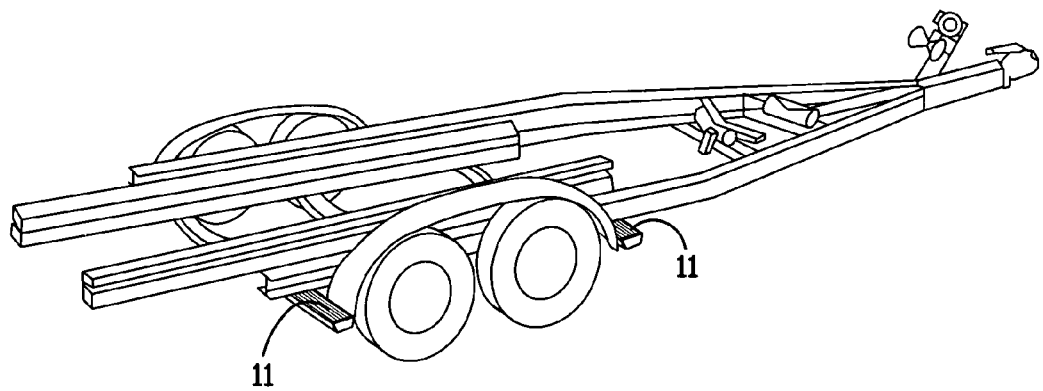
FIG. 9 is a perspective view of a boat trailer with the steps installed on the front and rear portion of a fender.

The cross section of the channel member 13 is trapezoidal-shaped, FIGS. 2, 7 and 8. The side walls 27 (flange members of the channel) are canted to slant inwardly from a vertical downward projection with respect to the top wall 31 (web member of the channel) which top wall 31 carries the slip retardant rib features 21. The cross-sectional shape of the channel 13 is symmetrical, which lends to its ability for universal mounting on the left-hand side or on the right-hand side of a trailer, and for mounting on the front or the rear of a fender, FIG. 9. The inward cant angle of each channel side wall 27 is typically in the range of from 5 to 10 degrees, with a nominal range of from 6 to 7 degrees. This permits the side walls 27 to neatly abut most commercially available fenders. The slant-in or cant angle can be adjusted as fender shapes change. That, however, requires the machining of a new extrusion die.

An extrusion die (not shown) has been made so that when the channel member 13, FIGS. 3-8, is extruded the die forms four gutters. Two top gutters 33 are formed one each at the inside corner (the base) of the channel member 13, where a side wall 27 meets the top wall 31. Two bottom gutters 35 are formed one each at the bottom of each side wall 27. The top gutters 33 are each formed by a curved wall extending from the inside face of the top wall 31 towards a respective side wall 27. The bottom gutters 35 are each formed by curving the bottom edge of each side wall 27 inwardly. The manufacturing process for making a channel 13, however, is not metal working or hot or cold rolling, but extrusion.

Each of the four gutters, 27, 35 extends the length of the channel member 13. Further, each of the four gutters has an opening 37 forming a slot extending the length of each gutter 33, 35. The wall 39 forming each gutter 33, 35 has a circular cross section with the slot opening 37 forming an open arc segment in the circle.

The cover plate 15 is shaped to cover the outside end of the channel member 13, FIGS. 1 and 2. The perimeter edge of the cover plate abuts the outside edge of the channel member 13. The cover plate 15 is held to the channel member 13 by four friction-type push-on pins 41. Each pin 41 passes through a related hole 43 at a respective corner of the cover plate 15 to be inserted into the end of a respective gutter 33, 35 which at the outer end of the channel is a circular-like receiving hole. These pins 41 can be one-way pins with a series of feather-like rings extending about the shaft of a pin 41. Screws or other types of fasteners may be substituted for the push-pins 41.

The marker light/clearance light 17 is mounted to the side wall 27 of the channel member 13, FIGS. 1, 2, and 8, on the side 27 opposite the side attached to a fender with fender bolts 29. A light mounting hole 45 has been drilled or punched through each side wall 27 for mounting the light 17 at a desired location adjacent to the plate covered end of the channel member 13. Generally, the light 17 has a threaded stud 47 which extends through the mounting hole 45 and a nut 49 which fastens on the inside of the side wall 27.

A rubber or plastic grommet 51 is fitted into the unused outboard fender bolt hole 25 to protect the light wiring 53 which is passed into the interior of the channel member 13 from the light 17.

The bottom gutter 35 adjacent the side wall 27 upon which the light 17 is mounted is also used as a wiring gutter for the light. One or more plastic, or metal clamp tabs 55 are positioned between the respective top and bottom gutters 33, 35 to keep the wiring 53 in place in the bottom gutter 35. The light wiring 53 is connected into a trailer wiring system.

The step of the present invention is manufactured by first extruding the alloy aluminum, C-channel with angled inward side walls forming a trapezoidal-like cross-section for the channel. As a part of the extrusion process, longitudinally extending, parallel ribs are formed in the top face of the top wall of the channel/step. Further, as a part of the extrusion process, the bottom edge of each side wall is formed with a circularly projecting, inward curved lip. Also, as a part of the extrusion process, a pair of downwardly projecting walls are formed to each extend from the inside face of the top wall.

These downwardly projecting walls are each formed in a circular arc. The circular projecting lips and the circular arc walls each provide a gutter extending the length of the channel whereby two or more circular-like openings are provided at each end of the channel.

The channel "stock" is extruded to any length convenient for handling and/or storage, as an example, in lengths of 10 to 50 feet. Channel stock can then be "parted-off" to a predetermined manufactured length by shearing, sawing, or other suitable operation. As an alternative, individual channel pieces can be sheared to manufactured length at by a shearing machine positioned on the output of the extruder.

End plate covers are injection molded if made of plastic material and stamped if made of metal. The end plate shape and size is matched to the outward end of the channel plate and secured with push-pins which are pushed through the corner holes in the end cover to engage the ends of the respective gutters. Metal end plates can be embossed and plastic end plates can be molded to carry the manufacturer's name, logo, or trademark, or the product name.

Prior to the mounting of the end plate, if the step is to be mounted to the rear of a fender and requires a light, a turn signal/marker light is mounted with its wiring down an adjacent gutter to the inside end of the channel.

The channel is then bolted to the trailer frame side rail and to the adjacent fender, and the electrical wiring, if any is connected to the trailer's wiring.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

What is claimed is:

1. A step for a trailer, suitable for attachment to either the right side or the left side rail of said trailer in transverse attachment thereto, and in attachment to a respective fender on said trailer, comprising:

an elongate channel of trapezoidal cross-section having at least a top wall and two side walls, said two side walls downward extension each slopes inwardly;

at least two interior gutters extending longitudinally along said channel at two adjacent corners of said trapezoid cross-section, said gutters opening onto at least one end of said channel and at least one of said gutters being formed by an inward curl of the bottom edge of a side wall;

at least one adaptive structure on at least one side wall of said channel, wherein said side wall abuts said fender for said attachment;

an elongate adaptive structure on the top wall of said channel for use in the transverse attachment of said step directly to a trailer side rail;

wherein each said side wall adaptive structure includes at least one fender bolt hole, and wherein said top wall adaptive structure is an elongate bolt hole;

wherein each said gutter extends longitudinally the entire length of said channel and provides an open cavity at an end of said channel, said open cavity being capable of receiving and holding a fastener;

wherein there are four gutters of arc-shaped cross-section, one located at each respective inside corner of said trapezoidal shape of said channel, each said gutter having an elongate slotted opening extending the length thereof;

also including a cover plate over said end of said channel, said cover being held thereto with fasteners engaging said gutter openings at the end of said channel; and also including a lamp mounted to a side wall with wiring thereof extending through the length of an adjacent gutter held therein by a clip extending between adjacent gutters.

2. A fender step for a trailer, said step being suitable for transverse attachment to either side rail of said trailer immediately adjacent to a fender on said trailer, comprising:

a trapezoidal-shaped cross-section channel, said channel having a top wall and two side walls each sloping inward as they each extend downward from said top wall;

a hole in said top wall of said channel suitable for receiving an attachment member for attaching said top wall transversely directly to a trailer side rail;

at least one hole in a side wall of said channel suitable for receiving attachment means for holding an inward sloping side wall to said fender;

also including a longitudinal gutter extending the length of said trapezoidal-shaped channel at each interior corner of said trapezoidal shape, each gutter opening onto each end of said channel;

wherein said top wall hole is elongate allowing for an adjustment for an attachment point on said trailer side rail;

and also including a pair of side wall holes, and a lamp mounting hole in each side wall of said channel;

also including a lamp mounted to a lamp mounting hole on one of said side walls, said lamp mounting being on the wall opposite said fender attachment;

also including a grommet fitted to a hole not used for mounting said lamp, wherein said lamp wiring is passed into said channel through said grommet-lined hole and down an adjacent gutter, said lamp wiring being held in said gutter by a clip extending between the two gutters adjacent said lamp mounting side wall.

3. The fender step of claim 2, also including a slip retardant surface on the outside face of said top wall;

wherein said slip retardant surface includes a plurality of parallel upstanding ribs on said outside face;

wherein each said gutter includes a slot extending its length;

also including a plate covering the outside end of said step;

wherein said cover plate is held to said step by attachment members engaging the ends of said gutters;

wherein said channel, said gutters and said upstanding ribs are formed as one extrusion; and wherein said clip holding said lamp wiring and extending between said two gutters engages each said gutter elongate slot.

4. A method of providing a fender step for a boat trailer of claim 1, comprising the steps of:

making a long extrusion in a channel shaped, with a trapezoidal cross-section with a top wall and two side walls each side wall sloping inwardly as it extends from said top wall;

providing a plurality of interior gutters each at an interior corner of said trapezoid shape and extending the length of the walls of said extrusion;

providing a plurality of upstanding parallel positioned ribs on the outer surface of the top wall of said extrusion;

parting-off said extrusion to a desired length;

making an elongate hole through the top wall of said extrusion adjacent one end thereof;

making a plurality of holes in each side wall of said extrusion, at least one said side wall hole being suitable for a fender mounting bolt, and at least one said side wall hole being suitable for holding a lamp;

covering an outside end of said extrusion with a plate, said plate being held to said outside end with attachment members engaging said interior corner gutters.

* * * * *